April 9, 1940.     W. H. GILLE ET AL     2,196,671
THERMOSTATIC ELEMENT
Filed Jan. 2, 1937
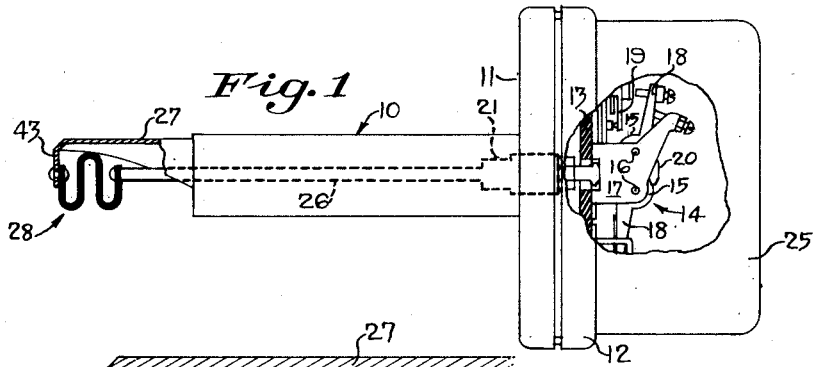
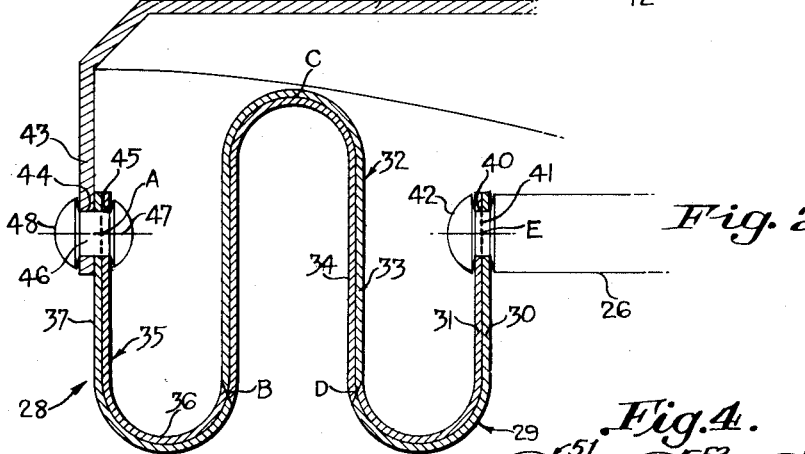
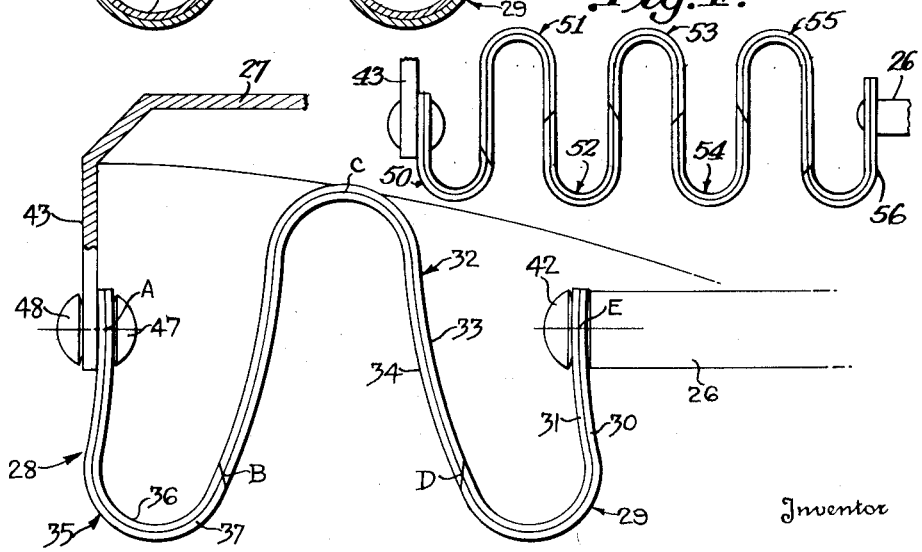
Inventor
Willis H. Gille
George A. Bouvier
By George H. Fisher
Attorney Patented Apr. 9, 1940

2,196,671

UNITED STATES PATENT OFFICE 2,196,671

THERMOSTATIC ELEMENT

Willis H. Gille, St. Paul, and George A. Bouvier, Minneapolis, Minn., assignors to Minneapolis-Honeywell Regulator Company, Minneapolis, Minn., a corporation of Delaware Application January 2, 1937, Serial No. 118,742

6 Claims. (Cl. 297—11)

This invention relates to thermostatic elements and more particularly to a type of element adapted to move a rod or analogous member to control switching mechanism for any desired purpose.

One object of this invention is the provision of an improved thermostatic element adapted to contract and/or expand in response to changes in the value of a condition as, illustratively, temperature.

An additional object is the provision of such an element which may be rigidly secured to an operating member and impart motion directly to said member both upon contraction and expansion thereof.

An additional object is the provision of such a thermostatic element wherein that portion of the element secured to the operating member will move in substantially straight line relationship with respect to a fixed point to which the opposite end of the element is secured.

A further and more specific object is the provision of an element embodying the objects and advantages above mentioned and to be hereinafter discussed in detail, which may be readily passed through a small aperture and/or encompassed in a relatively small space, at the same time imparting a relatively great movement to the operating member associated therewith.

As conducive to a clearer understanding of this invention, it may here be pointed out that in such devices as were hitherto known, in the absence of pivoted securing means straight line movement could be imparted to an operating rod only upon expansion of the element, suitable springs or other mechanism being provided to return the operating member to association with the thermostatic element upon subsequent contraction of said element. Conversely, in those instances in which it was desirable or necessary that movement be imparted to the operating member by the thermostatic element both upon expansion and contraction thereof, straight line movement of the operating member, assuming the same to be relatively rigidly secured to the bimetallic element and the latter in turn to be rigidly secured to a support, was impossible for the reason that in all such devices hitherto known expansion or contraction of the thermostatic element caused to some extent dis-alignment between the point at which the element was secured to a fixed member and the point at which it was secured to an operating member. Likewise, pivotal mounting of the bimetallic element was unreliable in that the pivots frequently tended to loosen up after a period of use, as well as being relatively complex and expensive. It is therefore an object of this invention to provide a relatively rigidly mounted thermostatic element which will obviate the difficulties above pointed out and provide substantially straight line movement of an operating member both upon expansion and upon contraction of the thermostatic element in response to changes in temperature or analogous condition value.

Other objects will in part be obvious and in part be pointed out hereinafter.

The invention accordingly consists in the combinations of elements, arrangements of parts and features of construction, all as will be more fully pointed out hereinafter and disclosed in the accompanying drawing, wherein is disclosed one illustrative embodiment of the inventive concept and wherein;

Figure 1 is a side elevational view partly in section of a device employing the thermostatic element of the instant invention.

Figure 2 is an enlarged side sectional view of the improved thermostatic element of the instant invention and certain parts associated with the mounting thereof, disclosing the element in contracted position.

Figure 3 is a side elevational view of the thermostatic element and certain parts associated therewith, certain of the latter being shown partially in section, disclosing the thermostatic element in its expanded position.

Figure 4 is an enlarged side elevational view of a modified form of the element.

Similar reference characters refer to similar parts throughout the several views of the drawing.

Having particular reference now to Figure 1, a sleeve 10 is secured in any suitable manner to a base plate 11 to which in turn is secured a mounting plate 12 containing an insulating panel 13 upon which is mounted in any suitable manner switching mechanism generally indicated at 14. Such switching mechanism may take the form shown in the co-pending application of Frederick S. Denison et al. entitled "Switching mechanism", filed of even date herewith, now Patent No. 2,159,503, dated May 23, 1939, or may be of the form disclosed in the co-pending application of Ernest M. Miller, Serial No. 77,758, filed May 4, 1936.

A more complete description of the switching mechanism 14 may be found in either of the above mentioned applications but for the purpose of the instant disclosure it suffices to state that a pair of rotatable members 15 are mounted upon axles 16 supported in a bracket 17 secured to insulating panel 13. Rotatable members 15 are rigidly secured to arms 18, each of which is associated with contact mechanism 19, the opening and closing of the contacts of contact mechanism 19 serving to control any desired mechanism. An operating rod or rack 20 passes between rotatable members 15 and either frictionally or by toothed engagement therewith serves to move the same to such position that the contacts are either opened or closed upon linear movement of rack 20 to the right or left as viewed in Figure 1, such movement being imparted thereto in a manner to be described hereinafter. A suitable casing 25 is mounted and releasably secured to mounting plate 12 and serves to shield and protect the mechanism as well as enhance the appearance of the instrument.

Operating rack 20 is secured to an insulating block 21 to the opposite end of which is secured an operating rod 26 which extends outwardly through sleeve 10 and through a suitable aperture in a supporting bracket 27, being secured in a manner to be more fully pointed out hereinafter to a thermostatic element generally indicated at 28. The mechanism is designed to be positioned adjacent a stack or flue or other structure the temperature of which it is desired be made the controlling factor to which the switching mechanism hereinbefore described responds. A suitable mounting flange (not shown) may surround sleeve 10 for securing the same in its desired position, the arrangement being such that thermostatic element 28 is positioned in the interior of the stack or flue above mentioned, and base plate 11 and the mechanism carried thereby positioned outside of the said stack or flue.

The structure hereinbefore described is disclosed in the previously mentioned applications of Denison et al. and Miller and while it is illustrated herein it is to be understood that the thermostatic element which comprises the essence of the instant invention may be readily utilized with any other structure wherein it is desirable that linear movement be imparted to an operating member in such manner that the member moves in a substantially straight line towards and away from associated mechanism in response to changes in the value of a condition.

Having reference now to Figure 2, it will be seen that element 28 is comprised of a plurality of segments, one of which is generally indicated at 29 and comprised of a strip 30 of a material of, illustratively, relatively low thermal expansion and a second strip 31 of relatively high thermal expansion. Secured thereto as by spot welding or soldering or in any other desired manner is a second segment 32 comprised of a strip 33 of relatively low thermal expansion and a second strip 34 of relatively high thermal expansion. Segment 29 is substantially U-shaped in configuration as is segment 32. A third segment 35 is secured to that end of segment 32 opposite segment 29 in a similar manner to that previously mentioned in connection with the securing of strips 29 and 32. Strip 35 is likewise comprised of a metallic strip 36 of relatively high thermal expansion and a second strip 37 of relatively low thermal expansion.

Thus it will be seen that the composite bimetallic unit 28 is comprised of three loops, as disclosed in Figure 2, and that the outer portion of each of said loops is comprised of a passive portion or a metallic strip of relatively low thermal expansion and that the inner portion of each of said loops is comprised of an active portion or strip of relatively high thermal expansion. It will further be seen that upon, illustratively, an increase in the value of the condition or temperature adjacent thermostatic element 28 the tendency of the element will be towards expansion and each of the loops above referred to will expand outwardly, imparting a multiplied movement to operating member 26 in a direction towards the right as viewed in Figures 1, 2 and 3.

Strip 29 is provided with an aperture 40 through which is passed a reduced portion 41 of operating member 26, the end of which is peened as at 42 to provide a relatively firm connection between thermostatic element 28 and operating rod 26. Similarly, supporting member 27 is provided with a downwardly turned portion 43 having an aperture 44 therein positioned for registry with an aperture 45 carried by the end of strip 37. A suitable rivet 46 is passed through apertures 44 and 45 and headed as at 47 and 48 to provide a tight connection between downwardly depending portion 43 and strip 36 of thermostatic element 28. Thus it will be seen that upon expansion of the thermostatic element 28 to the position shown in Figure 3, operating rod 26 will be moved inwardly with respect to switching mechanism 14 and upon contraction of thermostatic element 28 to the position shown in Figure 2, operating rod 26 will be moved outwardly with respect thereto to impart movement to the contact structure in the manner previously described.

It should here be pointed out that in order that the movement of operating rod 26 may be in a substantially straight line direction both upon expansion and contraction of element 28, it is essential that strips 31, 34 and 36 be composed of identical material, or in any event of materials having identical thermal coefficients of expansion and that correspondingly strips 30, 33 and 37 be likewise composed of identical material. In such case it will be seen that the radius of expansion of each of composite strips 30, 32 and 35 be identical. The strips are so designed that the distance as measured along the center line of the metal from a point A positioned relatively in the center of aperture 45 of strip 35 to a point B, which point is at the midpoint of the juncture of strips 35 and 32 is substantially identical to the distance between point B and a point C, which latter point is exactly in the central portion of the loop formed in strip 32 or, in other words, in the exact center of strip 32, since the loop is formed in the midportion thereof. Correspondingly, the distance from point C to point D, point D being positioned substantially at the midpoint of the juncture between strips 32 and 29 is substantially identical to the distance between points D and E, which point E is centrally positioned with respect to aperture 40 in strip 29.

Thus from the foregoing it will be seen that the effective length of strips 29 and 35, as measured from the midpoints of the apertures therein which form the operating points of each of these strips and which tend to curve in one direction upon, illustratively, an increase in temperature, is substantially identical to the total length of strip 32 which tends to curve in the opposite direction upon such temperature increase.

Applicant is aware that certain previous bimetallic elements have been constructed, which comprise oppositely disposed bimetal loops or arcuate members, having their active sides oppositely disposed with respect to each other.

However, in all such prior art structures constant parallelism of the ends of the operating member has not hitherto been obtained for the reason that in all such prior art structures, each oppositely disposed arcuate section was symmetrical about a center line formed through the base thereof and midway between the ends. It therefore followed, considering each arcuate segment as a unit, that temperature change adjacent such a unit would produce equal deflection on both sides of the center line.

Therefore, if a number of such elements were secured together end to end and heated it is obvious that the points of juncture would remain in straight line relation. It is also readily apparent that the center line of each individual segment would remain normal to the center line of the element, and since the angle between the outer leg of an end section and the center line of that section would vary in accordance with temperature value change, it follows that the point of mounting at the outer end of the last section would vary in angularity with respect to the center line of that segment.

In the instant invention means are provided, as will be more fully pointed out hereinafter, whereby the angularity of the point of mounting of an extreme section with respect to the center line of a segment remains constant, thus obviating many of the difficulties encountered in prior devices.

The manner of accomplishment of this may be explained by a consideration of the structure above described in conjunction with the known movement of a curved bimetallic strip.

According to Villarceau's theory as expounded in Note Sur Les Bilames de Precision, Ste. Ame. De Commentry Fourchambault et Decazeville, the change of the radius of curvature $R$ at a point of a bimetallic strip the temperature of which varies from $T_0$ to $T$ is given by the equation:

(1) $$\frac{1}{R} - \frac{1}{R_0} = \frac{T - T_0}{h}$$

where (2) $$h = \frac{2e}{3(a_2 - a_1)}\left(1 + \frac{(E_1 e_1^2 - E_2 e_2^2)^2}{4e^2 e_1 e_2 E_1 E_2}\right)$$

in which:

$a_1$ and $a_2$ are the coefficients of expansion of the two materials respectively;

$e_1$ and $e_2$ are the respective thicknesses of the constituent portions of the strip;

$e$ is the total thickness of the bimetallic strip, and, $E_1$ and $E_2$ are the moduli of elasticity.

If we divide the strip of the subject application into curved and straight sections, then each component is of uniform curvature, that is, at any given temperature each such component has a uniform curvature along its entire length. Consequently upon deflection of the bimetallic strip 28 due to a change in temperature all of these components comprise arcs of a circle. Now if tangents are drawn to opposite ends of a circular arc, the supplement of the angles between the tangents or, in other words, the angle of deviation $\theta$ of the end of the arc from a straight line condition is represented by the equation:

(3) $$\theta = \frac{L}{R}$$

or (4) $$R = \frac{L}{\theta}$$

where $L$ represents the length of the arc.

Substituting Equation (4) in Equation (1) the following equation is obtained:

(5) $$\frac{\theta}{L} - \frac{\theta_0}{L} = \frac{T - T_0}{h}$$

which when simplified becomes (6) $$\theta - \theta_0 = L\frac{(T - T_0)}{h}$$

If $\theta - \theta_0$ is replaced by $\Delta\theta$ representing the angular change, and $T - T_0$ is replaced by $\Delta T$ representing the temperature change, the following formula results:

(7) $$\Delta\theta = \frac{L \Delta T}{h}$$

Since the term $h$, as is obvious from Equation (2), is independent of the curvature of the bimetal, it will be observed that the angular deflection of any component having a uniform radius of curvature is independent of the degree of curvature or, in other words, the shape of the bimetal.

Turning now to the structure of the bimetal element of the present application, it will be noted that on each side of the apex $C$ of the arcuate portion of segment 32, the bimetal can be divided into two equal portions oppositely disposed with respect to each other. Moreover, each such portion is composed in Fig. 2 of straight and circular arcuate portions, both of which have uniform radii of curvature. As proved above, the amount of angular deflection of a bimetal strip is independent of its radius of curvature, at least as long as that curvature is uniform. Therefore, the two portions will be deflected equally in opposite directions with the result that the angular relation between a tangent to the strip at the points A or B and a tangent at the point C does not change. Thus, the tangents at A and E, being initially perpendicular line through those two points, remain so.

Hereinbefore it has been assumed that the securing of the ends of bimetallic element 28 to support 43 and operating member 26 is of such nature that the bimetal is permitted to curve as from the points A and E. However, if the ends of element 28 are so tightly clamped to support 43 and operating member 26 that curvature of the bimetal is permitted only to the edges of the securing means, it will be seen by those skilled in the art that points A and E should be positioned at the edge of the securing means, or in other words, at the extreme limit of the permissible curvature of the bimetal and the distances A to B, B to C, C to D and D to E measured accordingly as previously pointed out.

It will additionally be seen that the strip as formed and disclosed in the drawing is of such overall dimensions that it may be readily inserted into any apparatus through which sleeve 10 will pass and that despite its relatively small overall dimensions due to the unique configuration thereof as previously explained, a relatively great movement will be imparted by the expansion and contraction thereof to operating rod 26 and further that such movement will be in a substantially straight line at all times.

It will be apparent to those skilled in the art that as many convolutions or loops as desired may be provided in the central portion of the element, the sole requirement being that each end section be proportioned as described above to exactly compensate for the movement of that half of the adjacent loop juxtaposed thereto. Thus a number of central loops may be positioned in balanced relation between the end loops and their composite movement will merely amplify the action of the element without affecting the relationship of the end segments.

Such an arrangement is shown in Fig. 4. The bimetal element of this figure consists of a plurality of reversely connected segments 50 to 56. The end segments 50 and 56 are similar to the end sections 35 and 29 of the species of Figures 1 to 3. The intermediate segments together constitute a section corresponding to the segment C of the previous species. The intermediate portions of this section are formed of three reversely connected U-shaped segments such as were used to constitute the entire element in certain prior art devices previously discussed. Inasmuch as the tangents at the apexes of the arcuate portions of both segments 51 and 55 remain parallel to the line through the fastening points and since the bimetal from these apexes to the ends are the same as in the other species, it will be apparent that the element will operate in the same way with the exception that greater movement will be obtained by reason of the greater number of convolutions.

Thus from the foregoing it will be seen that there is herein provided a structure achieving the objects of this invention and others including many advantages of great practical utility.

It will be apparent to those skilled in the art that other embodiments may be made of the structure above described and disclosed in the accompanying drawing, and that certain modifications may be made in the embodiment herein described. It is therefore to be understood that all such matter hereinbefore set forth and shown in the accompanying drawing is to be interpreted as illustrative and not in a limiting sense.

We claim as our invention:

1. A bimetallic element comprised of three substantially U-shaped segments, the central segment being curved in a direction opposite to that of the other two and having its more active side reversed in such manner that the outer curve of each U-shaped segment is comprised of similar metal, each end section being provided with means for securing the same, and the distance between the center of each securing means and the juncture of its associated segment with the center segment being equal to half the length of the center segment.

2. A bimetallic element comprised of a plurality of curved segments, adjacent segments being oppositely disposed in such manner that a material having a relatively high coefficient of thermal expansion is adjacent a material having a relatively low thermal coefficient of expansion, and the radius of curvature of each segment being reversed with respect to adjacent segments, the operating extremities of the end segments being substantially parallel and the length of each end segment from its operating extremity to its juncture with an adjacent segment being substantially equal to the length of that portion of said last mentioned segment extending from the said juncture to the apex of the curve.

3. In a thermostatic device including an operating member and a support, a bimetallic element comprising a plurality of arcuate segments, an extremity of one of which is relatively rigidly secured to said support and an extremity of another of which is relatively rigidly secured to said operating member, said curved segments being oppositely disposed with respect to each other in such manner that an active side of one is juxtaposed to a passive side of another, said segments being so proportioned that the distance from said securing means to the juncture of said segment with an adjacent segment is equal to the distance from said juncture to the apex of the arc of said adjacent segment whereby said alignment between said securing means is maintained at any temperature value throughout the normal range of temperature values to which the device is exposed.

4. In a thermostatic device including an operating member and a support, a bimetallic element comprising an intermediate portion made up of at least one arcuate section, bimetallic end sections secured to the ends of said intermediate portion and to the operating member and support, respectively, each of said end sections being so secured to the intermediate portion that the more active side of the end section is secured to the less active side of the adjacent section of said intermediate portion and vice versa, and said end sections each being of a size such that the distance between the point at which it is secured to the operating member or support and the juncture with said adjacent section is equal to the distance between said juncture and the apex of the arc of said adjacent section whereby a line tangent to said end section at the point at which it is secured to said operating member at one temperature will be parallel to a line tangent to said same section and point at any other temperature within the normal range of temperature values to which the device is exposed.

5. A bimetallic element comprising a plurality of segments of bimetal oppositely connected so that the more active side of one segment is connected to the less active side of the adjacent segment and vice versa, said element being reversely bent at a plurality of points so as to have a wave shaped configuration, said element being adapted to be secured at predetermined fastening points adjacent the end thereof to other devices, and said segments being of such length and so disposed that the element consists of two halves symmetrical about a center line drawn through the linear mid point of said element and perpendicularly to a line drawn tangent to the element at said point, each half containing equal amounts of oppositely disposed bimetal, whereby tangents drawn to the bimetal at the fastening points always maintain the same angular relationship with said line drawn through said one fastening point throughout the normal range of temperature values to which the element is exposed.

6. In combination with a support, a thermostatic device comprising a plurality of oppositely disposed bimetallic elements connected together at their ends so that each will flex oppositely to its adjacent element on temperature variations, said elements being arranged so as to be symmetrical about a line drawn perpendicular to a second line drawn tangent to the thermostatic device at its mid point, each half of said device being composed of an equal amount of oppositely disposed bimetal, and means for connecting one end of said thermostatic device to said support whereby the other end of said device will move back and forth in a straight line on variations in temperature.

WILLIS H. GILLE.
GEORGE A. BOUVIER.